Sept. 1, 1953

E. A. GLYNN 2,650,437

TIRE GAUGING DEVICE

Filed Aug. 28, 1950

INVENTOR
Edwin A. Glynn

ATTORNEYS

Sept. 1, 1953  E. A. GLYNN  2,650,437
TIRE GAUGING DEVICE
Filed Aug. 28, 1950  2 Sheets-Sheet 2
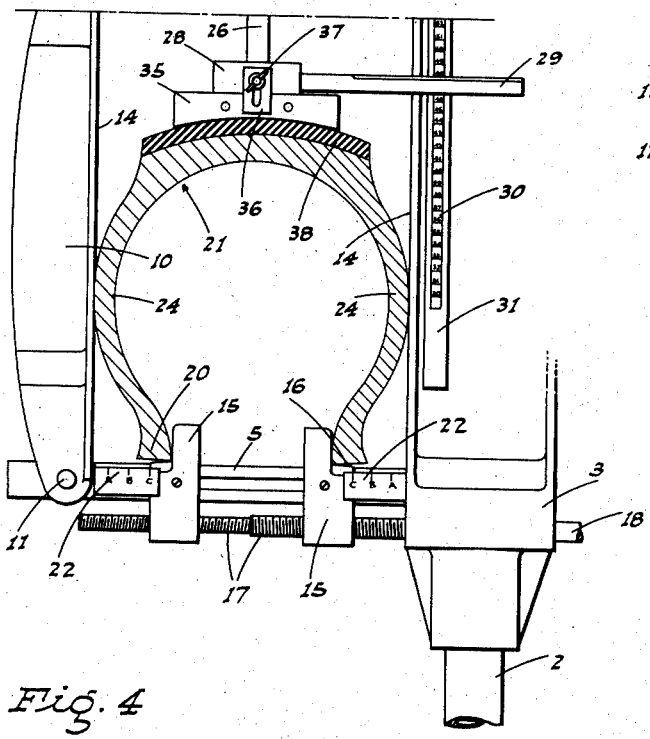
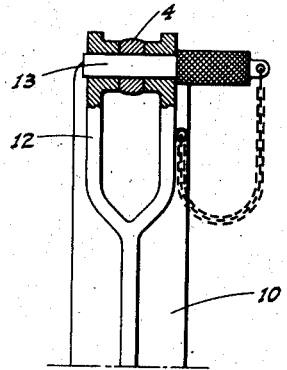
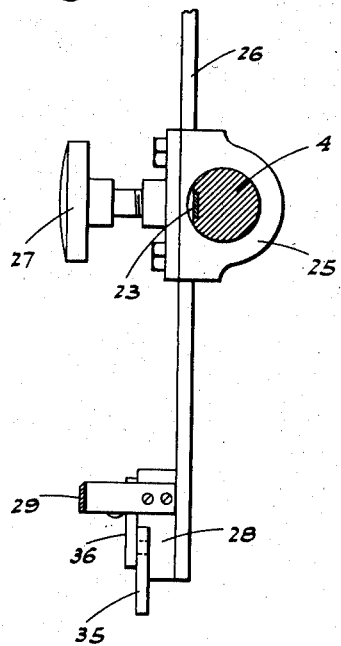
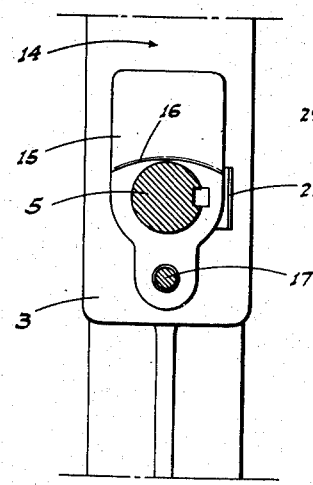
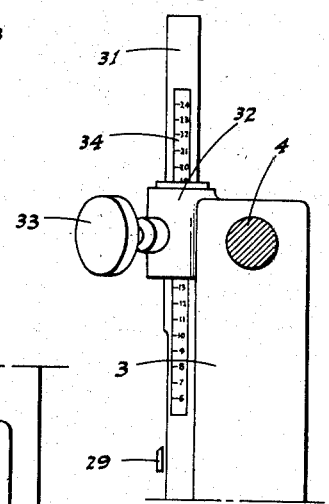
INVENTOR
Edwin A. Glynn
BY
ATTORNEYS Patented Sept. 1, 1953

2,650,437

UNITED STATES PATENT OFFICE 2,650,437

TIRE GAUGING DEVICE

Edwin A. Glynn, Lodi, Calif., assignor to Super Mold Corporation of California, Lodi, Calif., a corporation of California Application August 28, 1950, Serial No. 181,827

12 Claims. (Cl. 33—174)

1

This invention relates in general to the art of tire retreading; the term "retreading" as used herein being intended to include tread replacement by top capping, full capping, or full retreading.

In retreading worn tires it has been found that the beads, of the tire in the mold, must have certain spacing to permit the camelback or new tread material to assume a proper position in the tread forming matrix when the mold is closed and the tire inflated.

This spacing is accomplished in the mold by the use therein of a curing rim or ring assembly wherein included bead engaging elements are adjustable axially to alter their spacing, or—alternatively—rims or ring assemblies of different effective widths may be provided.

This invention provides, as a major object, a tire gauging device in which the tire to be retreaded is dimensionally gauged prior to insertion in the mold; the device being effective to indicate, to the operator, the correct width curing rim or ring assembly to be used with the matrix recommended for a tire of given standard size.

Another important object of the invention is to provide a tire gauging device, as above, wherein the tire—in one cross sectional area—is mechanically held in a position simulating the position which said tire will subsequently occupy in the mold in engagement with the matrix; there being novel gauging means then operative to indicate to the operator the correct width curing rim or ring assembly for use in conjunction with the matrix which the tire will require for proper retreading in the mold.

A further object of the invention is to provide a tire gauging device which is readily manually adjustable for use with tires of different standard sizes.

It is also an object of the invention to provide a tire gauging device which is designed for ready and convenient use for the purpose of predetermining proper tire bead spacing for a given matrix size.

Still another object of the invention is to provide a practical and reliable tire gauging device, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the device as in use;

2 the tire being in section, and the beads shown in their initial position.

Fig. 2 is a fragmentary side elevation similar to Fig. 1, but shows the beads as spread apart.

Fig. 3 is a fragmentary cross section on line 3—3 of Fig. 1.

Fig. 4 is a fragmentary cross section on line 4—4 of Fig. 1.

Fig. 5 is a fragmentary cross section on line 5—5 of Fig. 1.

Fig. 6 is a fragmentary cross section on line 6—6 of Fig. 1.

Figure 1:
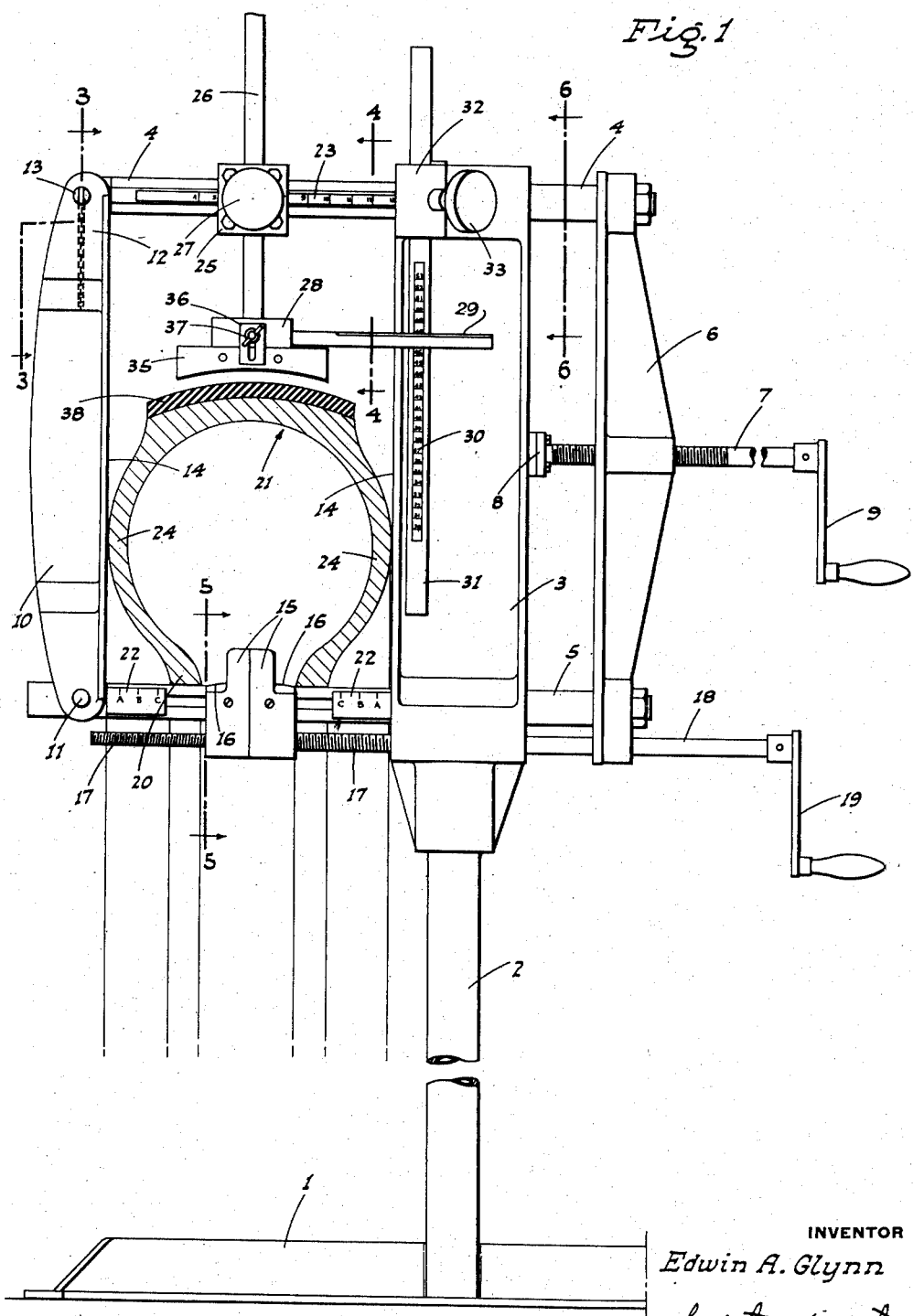

Referring now more particularly to the characters of reference on the drawings, the novel tire gauging device comprises a base 1 having a post 2 upstanding therefrom. At its upper end the post 2 is fixed in connection with an upstanding frame 3, and vertically spaced upper and lower slide bars, indicated at 4 and 5 respectively, extend horizontally and slidably through the frame 3.

At one end the slide bars 4 and 5 are connected by a vertical crosshead 6; there being an adjustment screw 7 threaded through the crosshead 6 centrally of its ends, and anchored—at the inner end—in rotatable relation to the frame 3, as at 8.

At its outer end the screw 7 is fitted with a hand crank 9 whose operation causes the slide bars 4 and 5 to be adjusted, with respect to the extent of their projection, from the frame 3 on the side opposite the crosshead 6.

Another vertical crosshead 10 normally extends between the free ends of the slide bars 4 and 5; such crosshead 10 being pivoted at its lower end, as at 11, for swinging motion between an upstanding and a horizontally outwardly projecting open position. At its upper end the crosshead 10 is formed with a clevis 12 which is normally secured to the free end of the slide bar 4 by a pull-out cross pin 13.

The adjacent faces of the upstanding frame 3 and vertical crosshead 10 are formed with vertical, tire engaging working faces 14.

A pair of bead supporting blocks 15, each including a bead receiving seat 16, are slidably keyed on the lower slide bar 5 intermediate the upstanding frame 3 and vertical crosshead 10.

The bead supporting blocks 15 are initially in abutment, as in Fig. 1, but are adapted to be separated, with equal travel, by reason of threading thereof on oppositely threaded portions 17 of a horizontal shaft 18 which extends freely through the frame 3 and lower end of the crosshead 6, terminating beyond the latter and there being fitted with a hand crank 19.

Upon operation of the hand crank 19 the bead supporting blocks 15 are caused to move apart, effectively separating the beads 20 of a tire, indicated generally at 21, which is supported by said blocks with the lower slide bar 5 projecting through the tire opening.

The bead supporting blocks 15 read in their adjusted positions (see Fig. 2) on corresponding bead spacing scales 22 suitably mounted in a fixed position parallel to, but spaced from, the lower slide bar 5.

On the side from which the bead spacing scales 22 are visible, the upper slide bar 4 is fitted with a longitudinal, tire width scale 23 which is read from the adjacent edge of the upstanding frame 3; such scale 23 serving to indicate the tire width dimension or space existing between the working faces 14, which working faces serve to maintain the side sidewalls 24 within predetermined limits of outward expansion.

A slide block 25 is mounted on the upper slide bar 4 and supports a vertical rod 26 in adjustable relation; there being a hand screw 27 which serves to lock the vertical rod 26 and the slide block 25 in fixed unitary relationship.

At its lower end the vertically adjustable rod 26 carries a mounting block 28 from which a horizontal gauge finger 29 projects laterally, reading on a tire diameter scale 30 formed lengthwise on a vertical rod 31 which runs, at its upper end portion, through a fixed guide collar 32. The rod 31 is held in its selective position of vertical adjustment by a hand screw 33 which runs through the collar 32. On a side separate from the tire diameter scale 30 the vertical rod 31 is formed with a separate, tire rim size scale 34 which is read on one end of the guide collar 32.

In addition to the horizontal gauge finger 29, the mounting block 28 supports a transversely extending tread templet 35; the latter being removably secured to the block 28 by means including a clip plate 36 and a wing nut 37.

Preparatory to placing the tire 21 in a tire retreading mold which includes a matrix, the old tread is removed from the tire and camelback or new tread material 38 is adhered about the tire as a continuous band.

After the tire has been thus prepared, it is placed in the above described tire gauging device by opening the crosshead 10 and suspending said tire on the lower slide bar 5, with the beads 20 in position to be engaged on the corresponding seats 16 of the supporting blocks 15 upon separation of the latter.

The slide bars 4 and 5 are then adjusted by the hand crank 9 until the tire width scale 23 reads equal to the inside width of the matrix (not shown) of the size recommended for the tire being repaired.

Similarly, the vertical rod 26 is adjusted, with the slide block 25 first disposed in a central position, until the gauge finger 29 reads on the tire diameter scale 30 equal to the inside diameter of said recommended matrix; the vertical rod 31 having initially been set by the scale 34 to a position corresponding to the tire rim size. Obviously, for tires of different rim size the rod 31 must be vertically adjusted so that the gauge finger 29 may correctly read the tire diameter on the scale 30.

After the working faces 14 have been set to position by the scale 23, and the templet 35 and gauge finger 29 set to position by the scale 30, the camelback 38 will normally lie somewhat below said templet; the latter representing the inner or working face of the matrix against which the camelback 38 must be positively engaged in the mold, while the working faces 14 represent the side skirts of the mold. In other words, the herein described tire gauging device simulates, through one cross sectional area of the tire, the position that the same will ultimately occupy in the mold.

With the parts adjusted as described, the hand crank 19 is actuated to cause the bead supporting blocks 15 to move equi-distantly in opposite direction, separating the tire beads 20. With such separation of the tire beads, and the confining of the sidewalls 24 by the working faces 14, the camelback 38 is urged outwardly until the templet 35 is engaged. When this occurs, the operator reads the position of the bead supporting blocks 15 on corresponding bead spacing scales 22, thereby readily determining the width of the curing rim or ring assembly which must be included in the mold to cause the camelback 38 to properly center on and engage the matrix during the curing operation.

By simulating, in the tire gauging device, the positions of the tire as they should exist in the mold, the operator can readily ascertain in advance, and accurately, the width size required for the curing rim or tire bead supporting assembly, whichever is employed in the mold to positively space the tire beads for the described purpose.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire gauging device comprising a support, a horizontal member projecting from the support to extend through the opening of a tire transversely thereof, a pair of tire bead supporting seats mounted on the member for relative separation along the member, means included in part with the support forming a pair of relatively separable working faces upstanding from said member on opposite sides of the seats and lying in a common plane with and extending in the same direction as said seats, the seats being adapted to receive the beads of a tire having its sides confined between said working faces, means operative to cause said relative separation of the seats and the working faces selectively, gauge means operative to indicate the spacing of said beads, other gauge means operative to indicate the spacing of the working faces, and separate gauge mounted on the device above the tire supporting seats and operative to indicate the outside circumferential diameter of the side-confined, bead adjusted tire.

2. A tire gauging device, as in claim 3, in which said separate gauge means includes a templet mounted for adjustment vertically toward and away from the tire supporting beads above the same to engage the tread portion of a supported tire, a laterally projecting gauge finger mounted in connection with the templet, and a scale upon which a gauge finger reads.

3. A tire gauging device, as in claim 4, in which said scale extends above and in the plane of the bead engaging seats, and means mounting said scale on the device for lengthwise adjustment; there being other scale means on said scale to indicate settings corresponding to tire rim sizes.

4. A tire gauging device comprising an upstanding frame, horizontal upper and lower bars projecting in alined vertically spaced relation from the upstanding frame, a crosshead connecting between the bars outwardly of the frame, upstanding working faces on adjacent sides of the frame and crosshead to confine the sides of a tire suspended on the lower bar, said frame and crosshead being relatively adjustable to alter the spacing between said working faces, a pair of bead seat forming blocks slidable on the lower bar between and lying in a common plane with and extending in the same direction as said faces, means arranged to cause said relative adjustment of the frame and crosshead, other means arranged to cause relative separation of said blocks and the tire beads thereon, gauge means operative to indicate the spacing of said beads, other gauge means operative to indicate the spacing of the working faces, and separate gauge means mounted on the device above the tire suspending bar operative to indicate the outside circumferential diameter of the side-confined, bead adjusted tire.

5. A tire gauging device, as in claim 4, in which said crosshead is detachable from one of said bars, and movably connected to the other; there being releasable securing means between said one bar and the adjacent portion of the crosshead.

6. A tire gauging device comprising an upstanding frame, horizontal upper and lower bars projecting in alined vertically spaced relation from the upstanding frame, a crosshead connecting between the bars outwardly of the frame, upstanding working faces on adjacent sides of the frame and crosshead to confine the sides of a tire suspended on the lower bar, said frame and crosshead being relatively adjustable to alter the spacing between said working faces, a pair of tire bead seat forming blocks slidable on the lower bar between said working faces and lying in a common plane with and extending in the same direction as said faces, means applied to the blocks to cause the blocks to separate with equal travel, bead spacing scale means with which said blocks cooperate upon separation thereof, means arranged to cause the frame and crosshead to relatively separate, scale means to indicate the resultant spacing of said working faces, and separate scale means on the device above the tire supporting bar operative to indicate the outside circumferential diameter of the side-confined, bead adjusted tire.

7. A tire gauging device comprising an upstanding frame, horizontal upper and lower bars projecting in alined vertically spaced relation from the upstanding frame, a crosshead connecting between the bars outwardly of the frame, upstanding working faces on adjacent sides of the frame and crosshead to confine the sides of a tire suspended on the lower bar, said frame and crosshead being relatively adjustable to alter the spacing between said working faces, a pair of tire bead seat forming blocks slidable on the lower bar between said working faces and lying in a common plane with and extending in the same direction as said faces, means applied to the blocks to cause the blocks to separate with equal travel, bead spacing scale means with which said blocks cooperate upon separation thereof, means arranged to cause the frame and crosshead to relatively separate, scale means to indicate the resultant spacing of said working faces, a vertical rod longitudinally and laterally adjustably secured to the upper bar and projecting downward toward the tire suspending bar, a tread template on the lower end of the rod, a gauge finger projecting laterally from the rod, another rod mounted parallel to but laterally of said first named rod, and a scale for outside circumferential tire diameter formed on said other rod and upon which scale said gauge finger reads.

8. A tire gauging device, as in claim 7, in which said other rod is longitudinally adjustable; there being separate scale means on said other rod to indicate settings corresponding to tire rim sizes.

9. A tire gauging device comprising an upstanding frame, horizontal upper and lower bars slidably projecting in alined vertically spaced relation through the frame, a crosshead connecting the slide bars at one end, means between the crosshead and frame to slidably adjust said bars in unison, a separate crosshead connected between the slide bars at their other end in openable relation whereby a tire may be suspended on the lower slide bar between the frame and said other crosshead, the latter and said frame having adjacent working faces to engage and confine the sides of the supported tire therebetween, a pair of tire bead seat forming blocks slidable on the lower bar for separating travel from an adjacent position and lying in a common plane with and extending in the same direction as said working faces, means to cause said blocks and engaged tire beads to separate with equal travel, scale means arranged to indicate spacing of the working faces, other scale means arranged to indicate spacing of the blocks and engaged tire beads, and separate scale means mounted on the device and operatively associated with the tire suspending bar so as to indicate the outside diameter of the side-confined, bead adjusted tire.

10. A tire gauging device comprising an upstanding frame, horizontal upper and lower bars slidably projecting in alined vertically spaced relation through the frame, a crosshead connecting the slide bars at one end, means between the crosshead and frame to slidably adjust said bars in unison, a separate crosshead connected between the slide bars at their other end in openable relation whereby a tire may be suspended on the lower slide bar between the frame and said other crosshead, the latter and said frame having adjacent working faces to engage and confine the sides of the supported tire therebetween, a pair of tire bead seat forming blocks slidable on the lower bar for separating travel from an adjacent position and lying in a common plane with and extending in the same direction as said working faces, means to cause said blocks and engaged tire beads to separate with equal travel, scale means arranged to indicate spacing of the working faces, other scale means arranged to indicate spacing of the blocks and engaged tire beads, a vertical rod longitudinally and laterally adjustably secured to the upper bar and projecting downwardly toward the tire suspending bar, a tread engaging template on the lower end of the rod, a gauge finger projecting laterally from the rod, another rod mounted on the device parallel to but laterally of said first named rod, and a scale for outside tire diameter formed on said other rod and upon which scale said gauge finger reads.

11. A tire gauging device comprising a support, a member on the support adapted to project through the opening of a tire transversely thereof, a pair of upwardly projecting seats to engage the beads of a tire in supporting relation mounted on the member for relative separation along the same, means mounted on the support to engage and confine a supported tire on opposite sides above the seats, gauge means mounted on the device and reading from the seats to indicate the outside circumferential diameter of a tire as supported and confined, means operative to cause such relative separation of the seats whereby to cause similar separation of the beads of such tire, and gauge means associated with the seats to indicate the spacing thereof.

12. A device as in claim 11, in which said means to confine the tire on opposite sides includes relatively separable elements having flat working faces, means mounted on the device and applied to one element operative to cause relative separation of said faces, and gauge means to indicate the spacing of said faces.

EDWIN A. GLYNN.

References Cited in the file of this patent
UNITED STATES PATENTS

| Number | Name | Date |
|---|---|---|
| 1,245,213 | Gammeter | Mar. 6, 1917 |
| 2,435,644 | Beckett | Feb. 10, 1948 |
| 2,548,490 | Muller | Apr. 10, 1951 |